Figure 1:
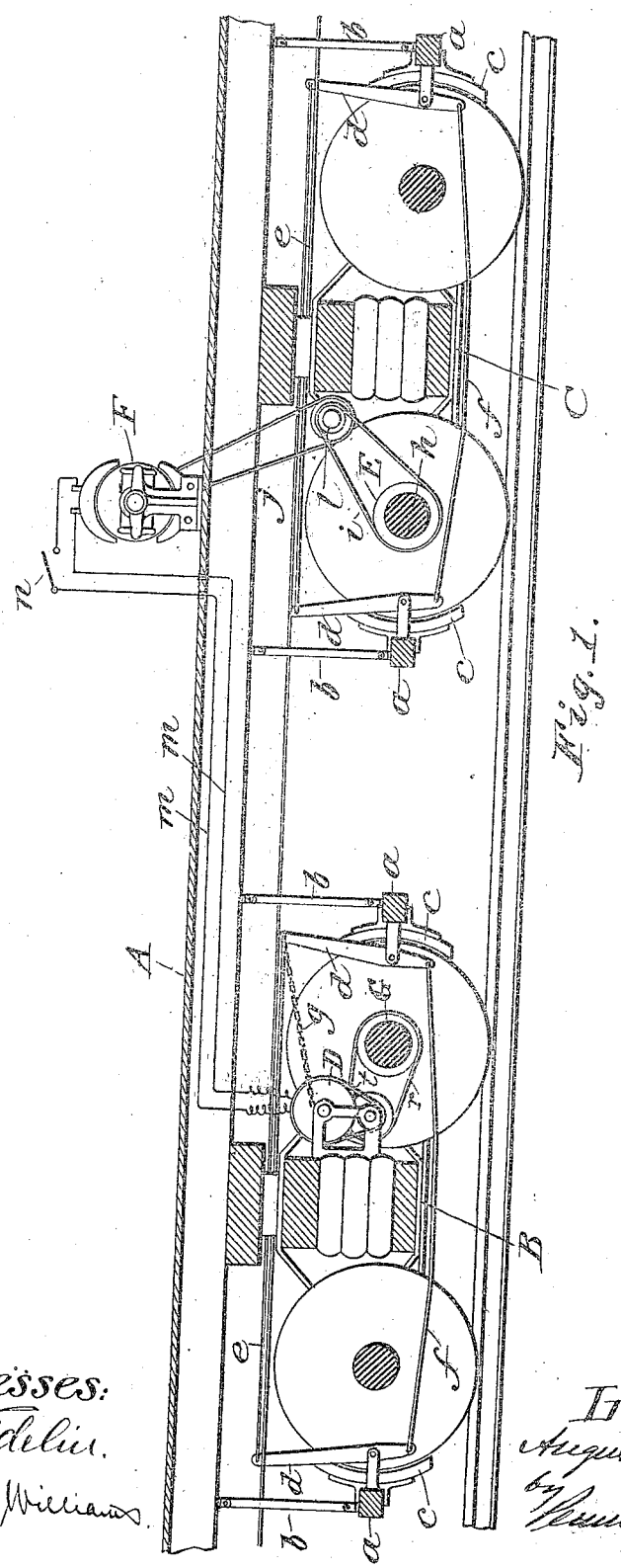

No. 828,879. PATENTED AUG. 21, 1906.
A. L. DUWELIUS.
AUTOMATIC ELECTRIC BRAKE.
APPLICATION FILED MAY 7, 1904.

2 SHEETS—SHEET 1.

Witnesses:
O. W. Edelin
W. Beall Williams

Inventor:
Augustus L. Duwelius,
by Daniel Goldsborough,
Attys.

No. 828,879. PATENTED AUG. 21, 1906.
A. L. DUWELIUS.
AUTOMATIC ELECTRIC BRAKE.
APPLICATION FILED MAY 7, 1904.
2 SHEETS—SHEET 2.
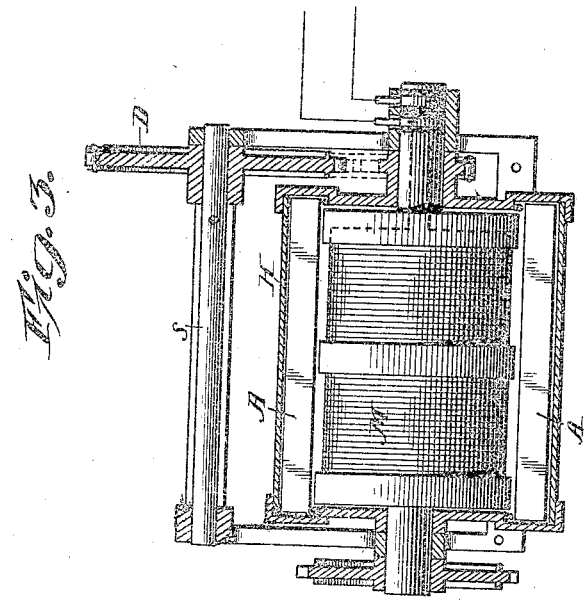
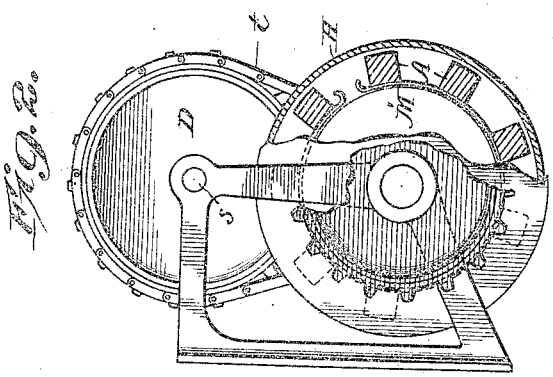

UNITED STATES PATENT OFFICE.

AUGUSTUS L. DUWELIUS, OF CINCINNATI, OHIO.

AUTOMATIC ELECTRIC BRAKE.

No. 828,879.   Specification of Letters Patent.   Patented Aug. 21, 1906.

Application filed May 7, 1904. Serial No. 206,860.

*To all whom it may concern:*

Be it known that I, AUGUSTUS L. DUWELIUS, a citizen of the United States, residing at Cincinnati, county of Hamilton, State of Ohio, have invented certain new and useful Improvements in Automatic Electric Brakes; and I do hereby declare the following to be a full, clear, and exact description of the invention, such as will enable others skilled in the art to which it appertains to make and use the same.

Prior to my present invention, so far as I am aware, it has been the practice in braking vehicles—as, for instance, cars or trains of cars—to apply a given amount of power to the brakes and to maintain or even increase the power applied until the vehicle has been brought to rest. The inefficiency of this method of braking is due to the fact that insufficient power is applied at the higher speeds and excess of power at the lower speeds of the moving vehicle. The excessive power at the lower speeds arrests the rotation of the wheels and causes them to slide or skid, thereby injuring them by destroying their rotundity and producing flat portions on their tread, causing them to be condemned as "flat wheels" and removed from service. Moreover, the retarding effect of sliding or skidding wheels is less than that of wheels in rotation, the greatest effect being at a point just before sliding takes place, for which reason a loss of time is experienced in the less prompt action of the braking mechanism when sliding or skidding occurs. It is practically impossible to so vary the power manually as to conform to the rapid changes of conditions.

Broadly considered, my invention consists in automatically graduating the braking power to conform to the varying speed of the vehicle during retardation, thereby securing the greatest possible retarding effect within the shortest time.

My invention is based upon the discovery that the relation existing between the speed of the vehicle and the electric current generated by a series dynamo—i. e., a dynamo having its field in series with its armature—driven by the rotation of the traction-gear—i. e., wheels or wheel-axles—of the vehicle, is such as to produce the greatest retarding effect under all conditions and such as to avoid the sliding, and consequently the flattening, of the wheels when the current generated is applied to actuate a magnetic clutch connecting a brake-chain-winding drum with the brake-rigging.

In the accompanying drawings I have illustrated in Figure 1, partly in section and partly in elevation, a car provided with means for practicing my invention. Figs. 2 and 3 represent detail views of the clutch and winding-drum, on a larger scale.

Referring to the drawings, A indicates a car frame or platform resting upon the wheeled trucks B C, the wheels of the trucks being provided with hand-brake rigging of any suitable character—as, for instance, the brake-beams $a$, swinging hangers $b$, brake-shoes $c$, brake-levers $d$, and brake-connecting rods $e f$. A chain $g$, adapted to be wound upon the shaft $s$ of a winding-drum, serves to actuate the brake-rigging when the magnetic clutch is energized by the dynamo.

In Figs. 2 and 3 I have shown my preferred form of electromagnetic clutch composed of a three-flange spool-magnet M, driven by the axle G through the belt $r$ and surrounded by armature-bars A, having their ends engaged in the heads of a drum H, adapted to revolve with the spool and wind the brake-chain when the spool is operated by the current. The larger wheel D (shown in the drawings) and the shaft $s$ of the wheel merely serve to multiply the power, being geared to the drum by a chain or belt $t$, as indicated. One of the car-wheel axles—as, for instance, $h$—carries a fixed pulley E, which through the intermediacy of transmitting-gear—as, for instance, the belts $i$ $j$ and counter-shaft $l$—transmits the rotation of the axle to a series dynamo F, located on the car-floor. The current generated by the dynamo is transmitted by the wires $m$ to the magnetic clutch when the switch $n$ is closed.

The mode of operation of the invention will be apparent. When the brakes are to be applied, the switch $n$ is closed, thereby completing the circuit from the dynamo-electric machine F to the magnetic clutch. The current generated by the dynamo immediately actuates the magnetic clutch and starts the winding-drum shaft into operation, thereby winding the chain $g$ and applying the particular brake-shoes governed thereby. As the speed of the car or train diminishes the current generated by the dynamo diminishes correspondingly, so that the braking power of the electric motor is automatically graduated in accordance with the progressively-diminishing speed of the car or train until the car or train comes to rest, this braking action being effected quickly without shock or injury to the vehicle or its load and without sliding or skidding.

Having thus described my invention, what I claim is—

1. An automatic electric brake, consisting of a series dynamo, mechanism for driving said series dynamo from the traction-gear and an electric translating device consisting of a magnetic clutch actuated from the series dynamo and connected with the hand-brake rigging of the vehicle, said clutch serving to complete a driving connection between the traction-gear and a winding-drum for the brake-chain; substantially as described.

2. An automatic electric brake, consisting of a series dynamo, mechanism for driving said series dynamo from the traction-gear, a magnetic clutch actuated from said dynamo, a winding-drum adapted to be connected with the traction-gear of the car by said magnetic clutch, a brake-chain connected to the brake-operating lever and hand-brake rigging likewise connected also to said lever; substantially as described.

3. An automatic electric brake, consisting of a series dynamo, mechanism for driving the rotor of said dynamo from the traction-gear, a brake-chain-winding drum normally disconnected from the traction-gear, and intermediate connections for driving the winding-drum from the traction-gear at a less speed than said gear but with an increment of power, said intermediate connections including a magnetic brake-clutch adapted to be operated by the dynamo-current; substantially as described.

4. An automatic electric brake consisting of a series dynamo, mechanism for driving the rotor of said dynamo from the traction-gear at a higher speed than said gear, a brake-chain-winding drum normally disconnected from the traction-gear, and intermediate connections for driving the winding drum from the traction-gear at a less speed than said gear but with an increment of power, said intermediate connections including a magnetic clutch adapted to be operated by the dynamo-current; substantially as described.

In testimony whereof I affix my signature in presence of two witnesses.

AUGUSTUS L. DUWELIUS.

Witnesses:
W. S. LITTLE,
HORACE H. ALLEN.